United States Patent [19]

Gotou

[11] Patent Number: 5,588,733
[45] Date of Patent: Dec. 31, 1996

[54] HEAD LAMP DEVICE FOR VEHICLE

[75] Inventor: Shinichirou Gotou, Saitama-ken, Japan

[73] Assignee: Honda Giken Kogyo Kabushiki Kaisha, Tokyo, Japan

[21] Appl. No.: 472,225

[22] Filed: Jun. 7, 1995

[30] Foreign Application Priority Data

Jan. 17, 1995 [JP] Japan .................................. 7-020898

[51] Int. Cl.$^6$ ...................................................... B60Q 1/12
[52] U.S. Cl. ................................. 362/37; 362/66; 362/40; 315/79; 315/82
[58] Field of Search .............................. 362/71, 66, 285, 362/287, 37, 43, 83.3, 40, 41, 36; 315/79, 80, 81, 82; 307/10.1, 10.8

[56] References Cited

U.S. PATENT DOCUMENTS

| | | | |
|---|---|---|---|
| 4,858,080 | 8/1989 | Oikawa | 362/71 X |
| 4,868,720 | 9/1989 | Miyauchi et al. | 362/71 X |
| 4,870,545 | 9/1989 | Hatanaka et al. | 362/72 |
| 4,891,559 | 1/1990 | Matsumoto et al. | 362/71 |
| 4,908,560 | 3/1990 | Shibata et al. | 362/71 |
| 5,099,400 | 3/1992 | Lee | 362/71 X |
| 5,158,352 | 10/1992 | Ikegami et al. | 362/71 |

FOREIGN PATENT DOCUMENTS

| | | |
|---|---|---|
| 62-77249 | 4/1987 | Japan . |
| 2296550 | 12/1990 | Japan . |

*Primary Examiner*—Ira S. Lazarus
*Assistant Examiner*—Thomas M. Sember
*Attorney, Agent, or Firm*—Weiner, Carrier & Burt, P.C.; Joseph P. Carrier; Irving M. Weiner

[57] ABSTRACT

A head lamp device for a vehicle in which a lighting region in front of the vehicle in a traveling direction can be adjusted in rightward and leftward directions comprises: a direction indicating signal outputting mechanism 11 for detecting an operation of a winker device and outputting a direction indicating signal; a steering signal outputting mechanism 12 for detecting a steering angle of a steering device and outputting a steering angle signal; a map information outputting mechanism 30 for outputting map information including road data; a present position detecting mechanism 32 for detecting a present position of proper vehicle on the map; and a control mechanism 10 for inputting the said direction indicating signal, steering angle, map information and information of the present position and adjusting the lighting region of the head lamp. The control mechanism 10 selects a first control mode when the direction indicating signal is outputted; a second control mode for adjusting the lighting region in response to the steering angle when the first mode is not selected and the present position is not found on the road data of the map information or a steering angle of the steering angle signal exceeds a predetermined range; and a third control mode for adjusting the lighting region in compliance with an expectation of forward road shape in a vehicle traveling direction in reference to the map information and the present position when the first and second control modes are not selected.

17 Claims, 7 Drawing Sheets

NAVIGATION SYSTEM

HEAD LAMP DEVICE FOR VEHICLE

BACKGROUND OF THE INVENTION

1. Field of Invention

This invention relates to a head lamp device for a vehicle, and more particularly, controlling of a lighting region of the head lamp in a horizontal direction.

2. Discussion of Relevant Art

The head lamp of a vehicle is in general operated to form the two different lighting regions of high-beam and low-beam by manual changing-over of them.

Variation of lamp optical axes between the high-beam and low-beam is directed in a vertical direction and the lamp optical axes are not changed in a horizontal rightward or leftward direction. However, when the vehicle runs along a curved corner or turns right or left, if the lamp optical axes are moved in a turning direction to deflect the lighting region, visibility is improved.

In view of the foregoing, there are many proposals in the prior art in which the lamp optical axes are controlled for their movements in the horizontal rightward or leftward direction in response to a steering angle of the steering wheel (for example, a gazette of Japanese Patent Laid-Open No. Sho 62-77249 (1987) or the like). However, the lighting region in such a prior art as above is not changed unless the steering wheel is operated, so that a turning direction can not be lighted at a stage before entering the curved part.

As an example of solving this problem under a combination with a navigation system, there is provided a system described in Japanese Patent Laid-Open No. Hei 2-296550 (1990).

This prior art example improves visibility more by a method wherein a curved part or the like is foreseen in advance in reference to both map information of the navigation system and information of the proper or subject vehicle position on the map, and the lighting region is changed before entering the curved part.

However, in the case that the vehicle runs on a place where no road data is present, there is a possibility that information in a navigation system is not helpful, or the vehicle can not be controlled or a control timing becomes unstable when the vehicle turns out of a planned course at a crossing point or the like.

It may also be feared that a timing of control to change the lighting region is not adequate for a certain vehicle speed.

SUMMARY OF THE INVENTION

The present invention has been accomplished in view of the foregoing and it is an object of the present invention to provide a head lamp device for a vehicle in which adjustment of the lighting region is properly carried out and a superior visibility can be attained even in the case that a vehicle runs on a place having no road information in a navigation system or the vehicle turns out of the planned course.

In order to accomplish the aforesaid object, the present invention provides a head lamp device for a vehicle in which a lighting region in front of the vehicle can be adjusted in rightward and leftward directions characterized in that the device comprises direction indicating signal outputting means for detecting an operation of a winker device and outputting a direction indicating signal; steering signal outputting means for detecting a steering angle of a steering device and outputting a steering angle signal; map information outputting means for outputting map information including road data; present position detecting means for detecting a present position of a proper vehicle on the map information; and control means for inputting said direction indicating signal, steering angle signal, map information and information of the present position and adjusting the lighting region of said head lamp. Said control means selects a first control mode when said direction indicating signal is inputted; a second control mode for adjusting the lighting region in response to said steering angle when said first mode is not selected and said present position is not found on the road data of said map information or a steering angle of said steering angle signal exceeds a predetermined range; and a third control mode for adjusting the lighting region in compliance with an expectation of a forward road shape in reference to said map information and the present position when said first and second control modes are not selected.

When the direction indicating signal is not generated and a vehicle runs normally on the road data of the map information, the lighting region is adjusted in compliance with a road shape in the front of the vehicle expected from the map information and the present position under a third control mode, so that the lighting region is changed fast in advance toward a turning direction the driver wants and then a superior visibility can be attained.

In addition, in the case that a vehicle runs on a place where no road data is found or a steering angle exceeds a predetermined range, a lighting region is adjusted in response to the steering angle under a second control mode, so that the controlling operation can be continued.

In the case that the direction indicating signal is generated and a steering angle of the steering signal is within a predetermined range, the lighting region is changed to a predetermined region in the steering direction under the aforesaid first control mode, and subsequently when the steering angle exceeding the predetermined range is inputted, the lighting region is controlled to be changed in response to the steering angle under the second control mode. Namely, when the winker device is operated, at first, the lighting region is changed to the predetermined region in the steering direction by one action so as to enable a turning direction to be visually confirmed early, and then after the steering angle is determined to have exceeded the predetermined range, the lighting region is changed in response to the steering angle. Thus the changing timing of the lighting region can be set properly and the visibility can be improved.

There may additionally be provided a vehicle speed signal outputting means for detecting a vehicle speed and outputting a vehicle speed signal. In this case, the control means changes at least one of an adjusting amount and an adjusting period of the lighting region in response to a vehicle speed of the vehicle speed signal under at least one of the first, second and third control modes, thereby a change of the lighting region which is most suitable for the vehicle speed can be carried out and the visibility can be improved more.

DETAILED DESCRIPTION OF THE PREFERRED EMBODIMENT

Referring now to FIGS. 1 to 10, one preferred embodiment of the present invention will be described as follows.

Figure 1:
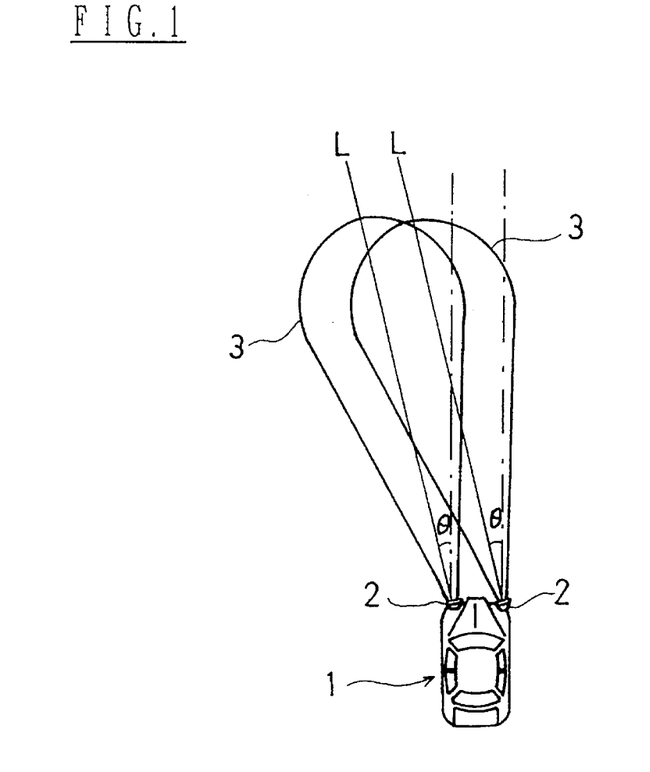
FIG. 1 is a view for showing a vehicle of one preferred embodiment of the present invention as viewed from above.

A vehicle 1 of the preferred embodiment has head lights 2 for lighting the space in front of the vehicle installed such that they are swingable in a rightward or leftward horizontal direction. FIG. 1 is a view for showing the vehicle 1 from above and in this figure, the right and left head lights 2 and 2 are swung leftward so as to cause the left forward regions to become lighting regions 3 and 3.

The right and left head lights 2 and 2 are swung together in the same direction by the same angle and as shown in FIG. 1, angles of their optical axes L and L with respect to an advancing direction of the vehicle, i.e. optical axis angles, are both set to be θ.

Figure 2:
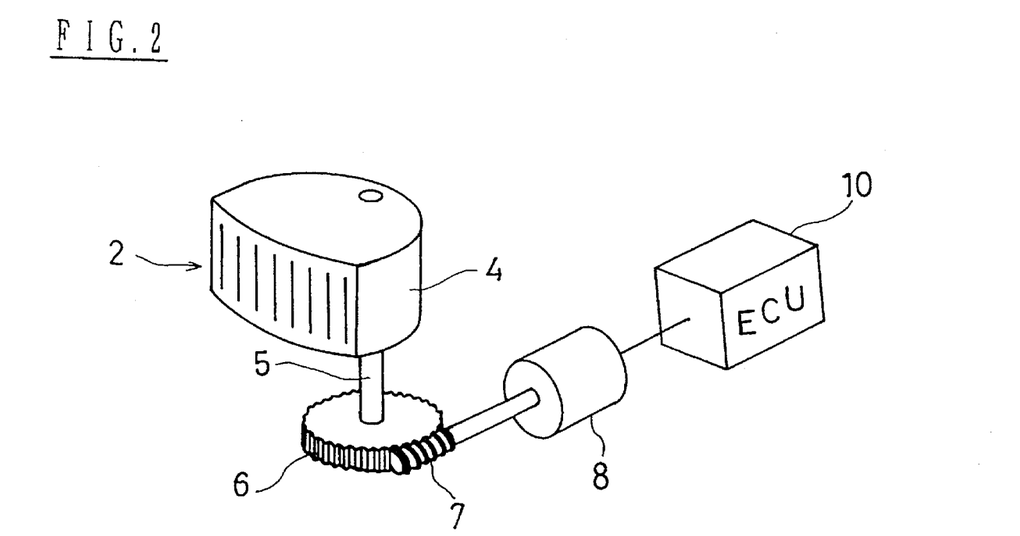
FIG. 2 is a schematic perspective view for showing an swinging mechanism for a head light of the preferred embodiment.

An swinging mechanism for swinging the head lights 2 in the preferred embodiment is schematically shown in FIG. 2, wherein a lamp unit 4 of the head light 2 is fixed to a rotary shaft 5, and a worm gear 7 formed at a driving shaft of a motor 8 is engaged with a worm wheel 6 fitted to the rotary shaft 5.

Accordingly, the lamp unit 4 is swung together with the rotary shaft 5 through an engagement between the worm gear 7 and the worm wheel 6 under a driving of the motor 8.

The motor 8 is controlled for its driving by a light distributing control ECU 10.

Figure 3:
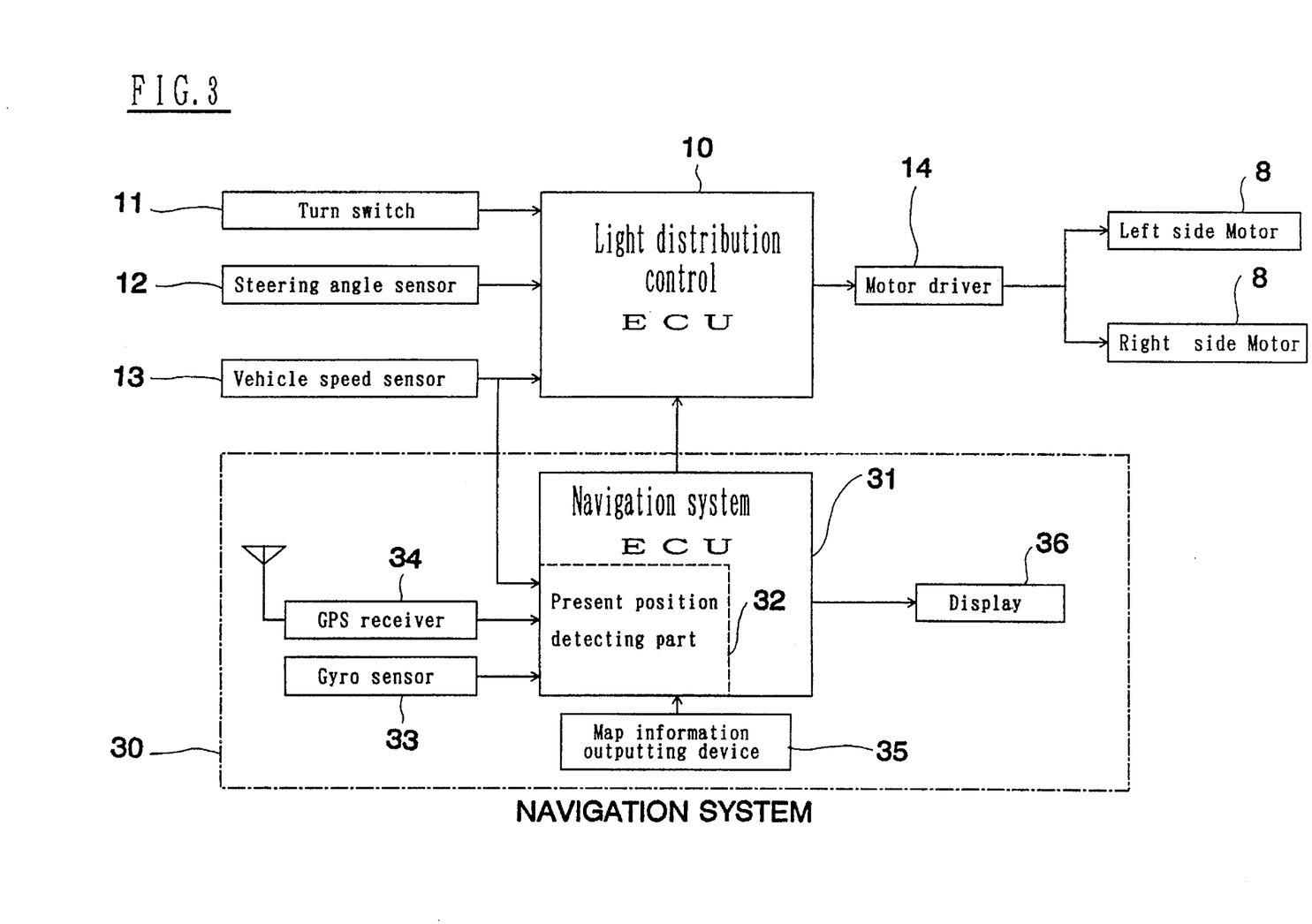
FIG. 3 is a block diagram for showing a light distribution control system of the preferred embodiment.

A schematic block diagram for a control system of the preferred embodiment is illustrated in FIG. 3 and the control system will be described.

This vehicle 1 has a navigation system 30 mounted thereon, the light distributing control ECU 10 gets map information and information of a proper vehicle position from the navigation system 30 and at the same time a direction indicating signal from a turn switch 11 which is turned on or off under an operation of a winker lever, a steering angle signal from a steering angle sensor 12 for detecting a direction of the steering wheel and a vehicle speed signal from a vehicle speed sensor 13 for detecting a vehicle speed or the like are inputted to the light distribution control ECU 10. The ECU 10 processes the informations and signals to determine a requisite optical axis angle θ, and an indicating signal is outputted to a motor driver 14 so as to achieve the optical axis angle θ, and thereby the right and left motors 8 and 8 are controlled in driving with the motor driver 14.

The navigation system 30 will be described in brief, wherein a navigation system ECU 31 acting as a control center is operated such that a present position detecting part 32 receives detecting signals from a gyro-sensor 33 and the vehicle speed sensor 13, calculates a moving position, obtains a position of the proper vehicle, performs a map matching, and at the same time performs a correction of the position of the proper vehicle with a position of the proper vehicle calculated from a satellite electric wave received from a GPS receiver 34 so as to detect an accurate position of the proper vehicle.

The position of the proper vehicle calculated in this way is displayed at a display 36 together with the road data outputted by a map information outputting device 35.

At the navigation system 30, many predetermined points (nodes) which can be searched in sequence along a road are set.

Spacings between the nodes set along the road on the map are different at a certain location, and normally the spacings between the nodes are wide at a linear road portion, the spacing at a curved road portion is set to be narrow and the nodes are set at crossing points without fail.

Various kinds of road information on the map, for example, degrees of curves or the like on the road are stored in correspondence with each of the nodes.

In addition, the navigation system 30 calculates the shortest path to a destination point and has a path guiding function for guiding the vehicle along the path.

Figure 4:
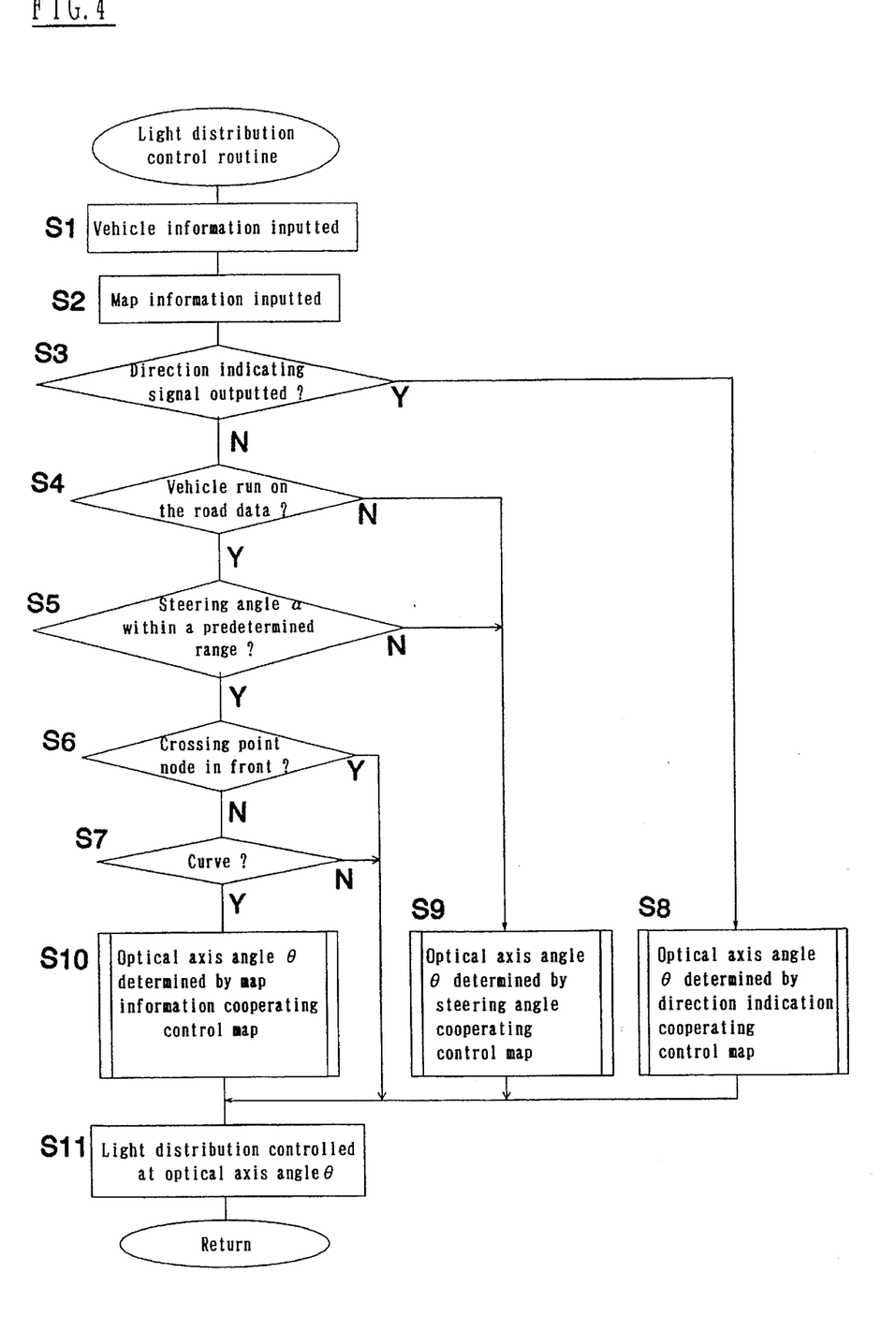
FIG. 4 is a flow chart for showing a procedure of the light distribution control.

Referring to a flow chart of FIG. 4, a procedure of light distributing control to be controlled in response to the control system above will be described as follows.

At first, vehicle information such as the state of the turn switch 11, a steering angle detected by the steering angle sensor 12 and a vehicle speed detected by the vehicle speed sensor 13 or the like are inputted (step 1). Then the map information in the navigation system 30, i.e. such as information stored for every required node as crossing points, directions of the curves or degrees of sharpness of curves, ect., is inputted (step 2).

Then, the operation proceeds to the step 3 to discriminate presence or non-presence of output of a direction indicating signal, and when the presence of the outputs judged, the operation jumps to the step 8 to enter a direction indicating cooperating control mode which is the first control mode. At the step 8, an optical axis angle θ is determined in response to a direction indicating cooperating control map, and at the step 11 the motor 8 is controlled in such a way that the light is distributed at the determined optical axis angle θ.

Figure 5:
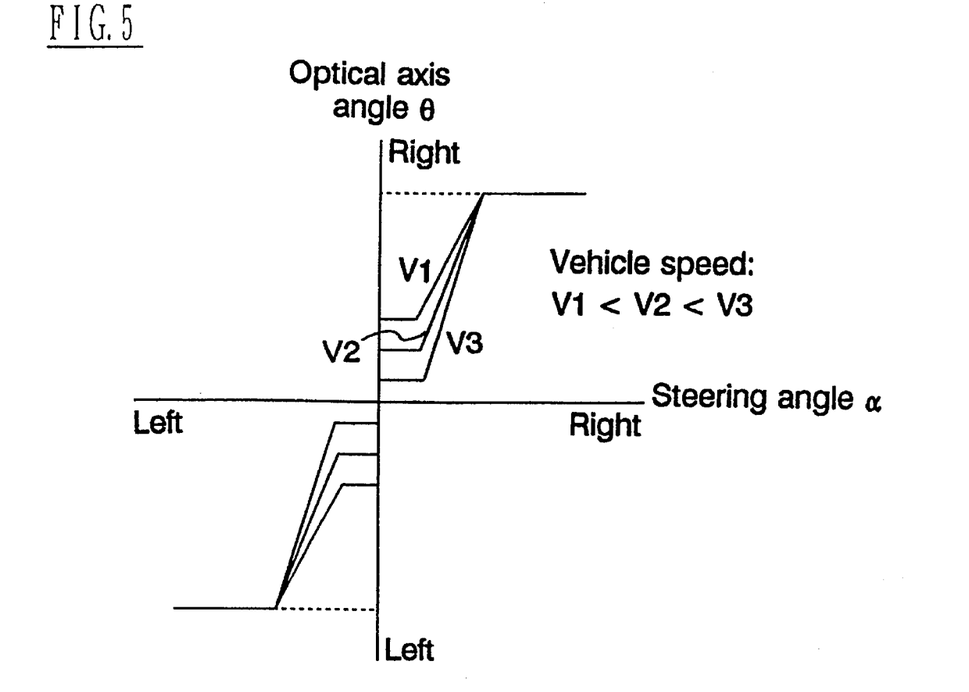
FIG. 5 is a view for showing a coordinate expression of a direction indicating cooperating control map.

FIG. 5 shows the direction indicating cooperating control map by means of coordinates.

That is, when the winker lever is operated to generate a direction indicating signal, the direction of the optical axis angle θ is determined in response to either the turning right or turning left indication and then a constant predetermined angle is determined in response to the vehicle speed.

As described above, when the winker lever is operated, the optical axis angle is changed at once to a predetermined angle for lighting the turning direction of the vehicle early, and the determined optical axis angle is larger as the vehicle speed is faster. Thus the angular direction that a driver may want to get as a visual confirmation is properly lighted so that a superior visibility can be attained.

Although the optical axis angle determined just after the operation of the winker lever is maintained while the steering angle α is less than or equal to a predetermined angle, if the angle α exceeds the predetermined angle, the optical axis angle θ is also made larger by controlling it in proportion to the steering angle α so as to coincide with the state of to the curve.

In addition, when the steering angle α is increased more than a certain value, the optical axis angle is fixed at a specified value.

The foregoing is the direction indicating cooperating control mode when the direction indicating signal is generated and the operation jumps from the step 3 to the step 8. In the case that the direction indicating signal is not generated, the operation advances from the step 3 to the step 4, and it is discriminated whether or not the proper vehicle runs on the road data in reference to the map information and the present position of the proper vehicle. In the case that the proper vehicle does not run on the road data, i.e. the vehicle runs on a place where no road data is found, the operation jumps to the step 9 and enters the steering angle cooperating control mode which is the second control mode. When the vehicle runs on the road data, the operation advances to the step 5 and it is discriminated whether or not the steering angle α is within a predetermined range.

This predetermined range is a range of the steering angle expected to be applied in the vicinity of the curve entrance which is determined in reference to a state of the curve of road data with a certain surplus, and this is a steering angle range having a possibility that the driver may steer, such as a range from the left 10° to the right 45° for a curve of right 30R, for example.

When the steering angle α exceeds this predetermined range, the vehicle comes to run outside of the normal road data. In this case, the operation jumps from the step 5 to the step 9 to enter the steering angle cooperating control mode similar to the case in which the vehicle does not run on the road data, and at the step 11 the light distribution is controlled under the same control mode.

Figure 6:
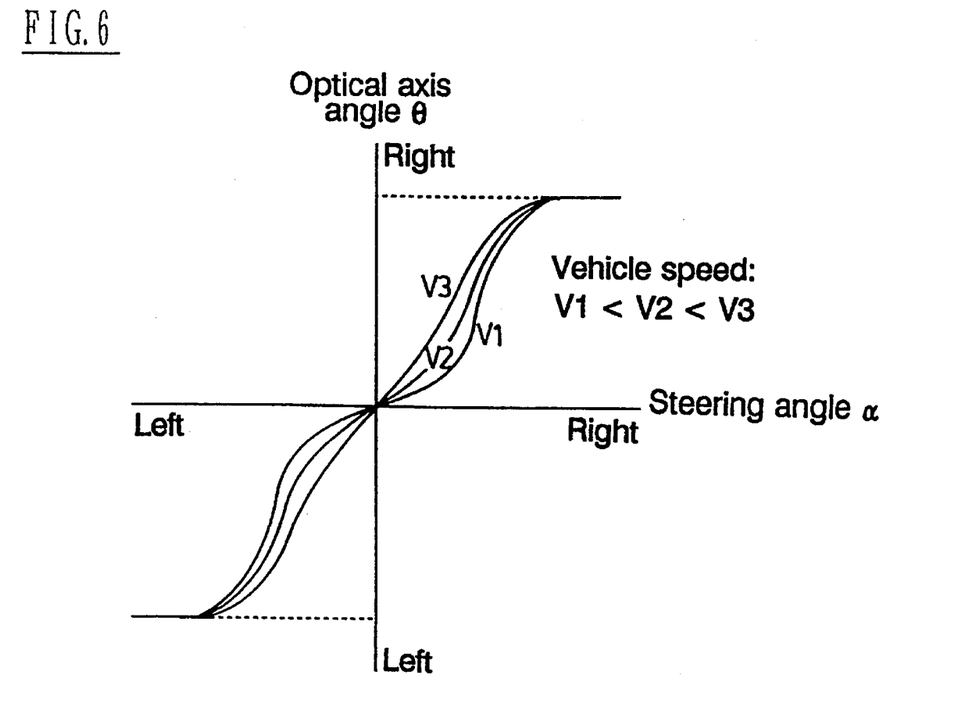
FIG. 6 is a view for showing a coordinate expression of a steering angle cooperating control map.

In the steering angle cooperating control mode when the vehicle runs outside of the road data, the optical axis angle θ is determined in response to the steering angle cooperating control map and FIG. 6 shows this control map by means of coordinates.

The optical axis angle θ is different in accordance with a vehicle speed and this angle is changed in a substantial proportion to the steering angle α under a high vehicle speed. In the case that the vehicle speed is low, there is provided a non-sensitive region where the optical axis angle θ is not much changed as long as the steering angle α is small and thus the lighting region is prohibited from being swung in a lateral direction upon sensitive reaction with a slight steering operation during the low speed running of the vehicle.

After the steering angle the exceeds a predetermined range and the operation jumps from the step 5 to the step 9 to enter the steering angle cooperating control mode, if the vehicle comes to run outside of the road data eventually, the operation jumps from the step 4 to the step 9 and the steering angle cooperating control mode is continued.

Then, upon returning to the road data again, the operation advances to the step 4 and step 5 and if the steering angle α is within the predetermined range, the operation advances to the step 6.

At the step 6, it is discriminated whether or not the crossing point node is present in front of the proper vehicle in a traveling direction and if the node is present, the operation jumps directly to the step 11 and the optical axis control is not performed temporarily, while maintaining the optical axis of the prior state just before, and if the crossing point node is not present, the operation advances to the step 7.

Figure 10:
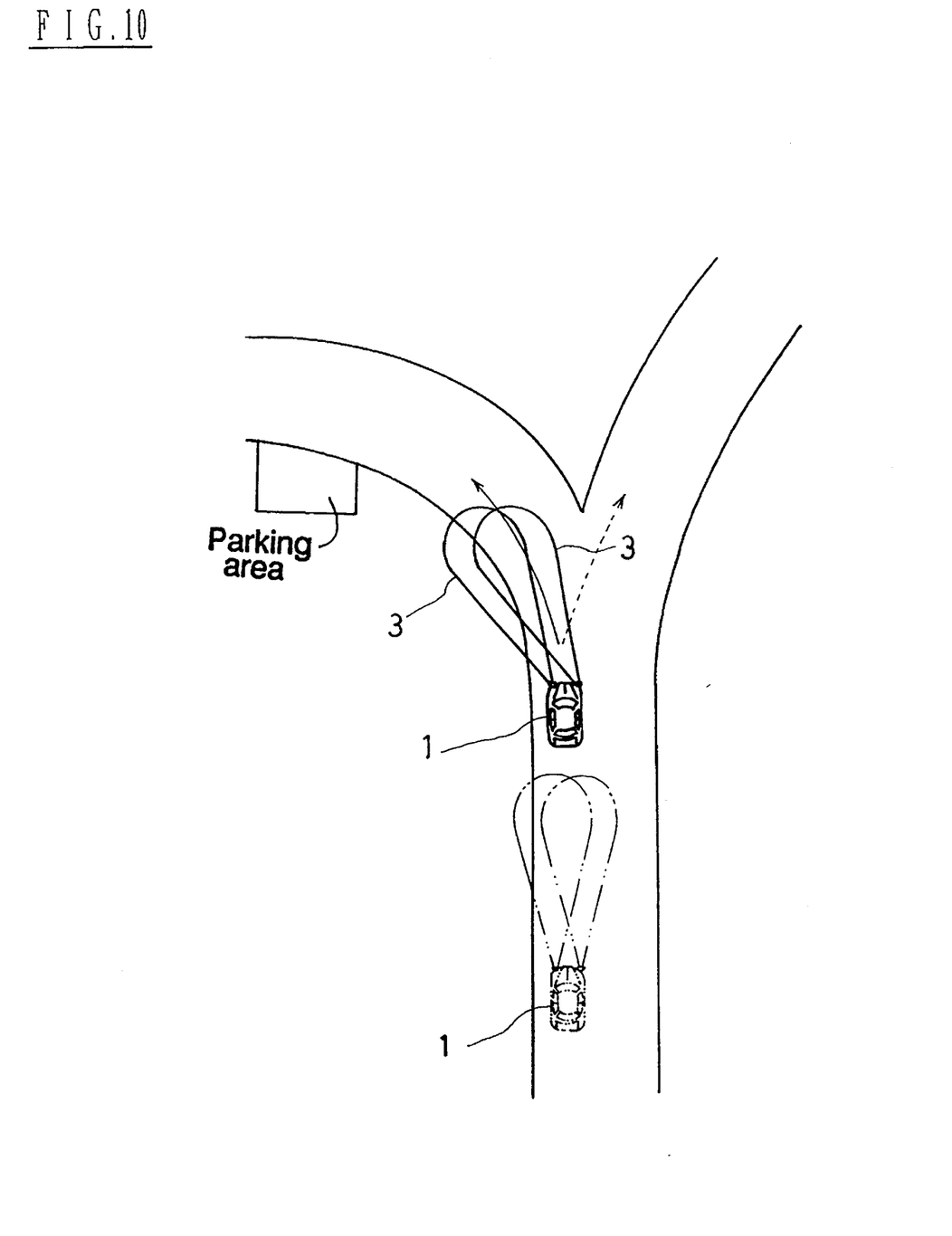
FIG. 10 is a view for showing a lighting region as viewed from above when there is a crossing point in a forward part.

A reason why the optical axis control is not temporarily carried out when the crossing point nodes are present consists in the fact that there is a possibility that the vehicle runs out of the planned running path and advances on another road. For example, it may happen that, as shown in FIG. 10, although the planned running path (indicated by a broken arrow line) turns to the right, there is a parking area on the road turning to the left and the driver intends to drop in there. In this case, if the optical axis is swung rightward toward the planned running path, the amount of light on the left side where the vehicle actually runs is lack and at the same time the optical axis is unnecessarily swung. Therefore, the optical axis control is temporarily prohibited to from being performed.

When the crossing point nodes are not present in a forward area, the operation advances to the step 7 and it is discriminated whether or not a curve is present in the forward area, and if there is no curve at all, the operation jumps to the step 11 and the optical axis control is not carried out. If there is a curve in the forward area, the operation advances to the step 10 and enters the map information cooperating control mode which is the third control mode and then the optical axis control under the map information cooperating control mode is carried out at the step 11.

At the map information cooperating control mode, it is analyzed whether the forward curve is directed, rightward or leftward, and how is the degree of curving of the curve in reference to the map information in the navigation system 30 and a proper optical axis angle θ is determined through retrieval of the map.

For example, radii R of curves may be classified into some classes in a stepwise manner and a predetermined optical axis angle θ may be set for each of the classes. The optical axis angle θ is larger as the curve is sharper (as R is smaller).

Since the map information cooperating control mode improves the visibility by varying the optical axis toward the planned running direction at an early stage before the steering wheel is actually turned, it is important that a timing of optical axis control is appropriate.

Figure 7:
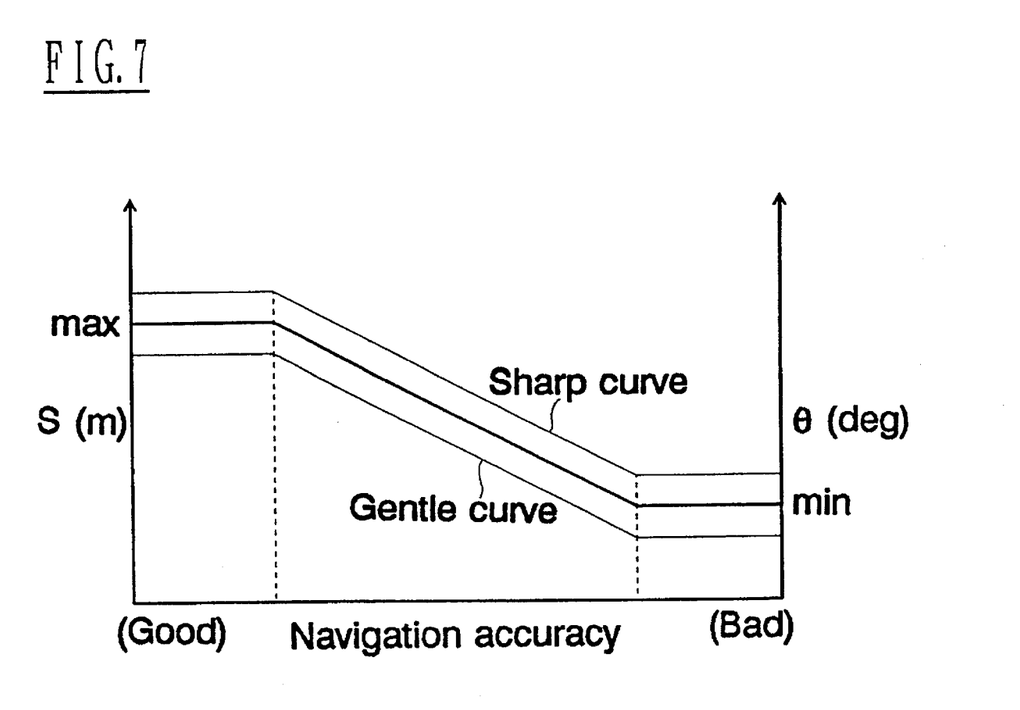
FIG. 7 is a view for showing a coordinate expression of a map so as to determine a control timing at a map information cooperating control mode.

In view of the foregoing, at the map information cooperating control mode, the timing control shown in FIG. 7 is carried out.

A distance S (m) from the curve entrance at which controlling of the optical axis angle is to be started and a predetermined optical axis angle θ (deg) to be set are determined in accordance with accuracy of the navigation system and a state of the curve.

The accuracy of the navigation system is judged in reference to the degree of matching when the map matching is performed.

The distance S ranging from the curve entrance to a point at which controlling of the optical axis is started is longer and a light distribution is changed at a more early stage as a planned optical axis angle θ is larger. In addition, the light distribution is changed more early when the curve is sharp.

In the case that the accuracy of the navigation system is good, it is controlled such that the light distribution is changed at an early stage and in the case that the accuracy is bad, the light distribution is changed later.

This is due to the fact that if the light distribution is changed early even if the accuracy of the navigation system is bad, a returning of the optical axis angle subsequently becomes necessary, thus causing the control to be unstable and the visibility is reduced rather than improved or an annoyance is given to the occupant in the vehicle.

Details of the present light distributing control are as described above and in the case that no output of the direction indicating signal is present, the vehicle runs on the road data, the steering angle α is within a predetermined range and crossing point nodes and curves are not present in a forward traveling direction of the vehicle, the optical axis control is not carried out (steps 1, 2, 3, 4, 5, 6, 7 and 11). When the curve appears during this state, the operation enters the map information cooperating control mode and a light distributing control fit for the state of the curve state is carried out at a suitable timing in consideration of the accuracy of the navigation system (steps 1, 2, 3, 4, 5, 6, 7, 10 and 11). When the steering angle α exceeds the predetermined range and the vehicle comes to run outside of the road data, the operation enters the steering angle cooperating control mode, and the light distributing control is carried out in response to the steering angle α under a consideration of the vehicle speed in reference to the steering angle cooperating control map (steps 1, 2, 3, 4, 5, 9 and 11). When the output of the direction indicating signal is present, the operation most preferentially enters the direction indicating cooperating control mode so as to perform the light distributing control on the basis of the direction indicating cooperating control map (steps 1, 2, 3, 8 and 11).

Figure 8:
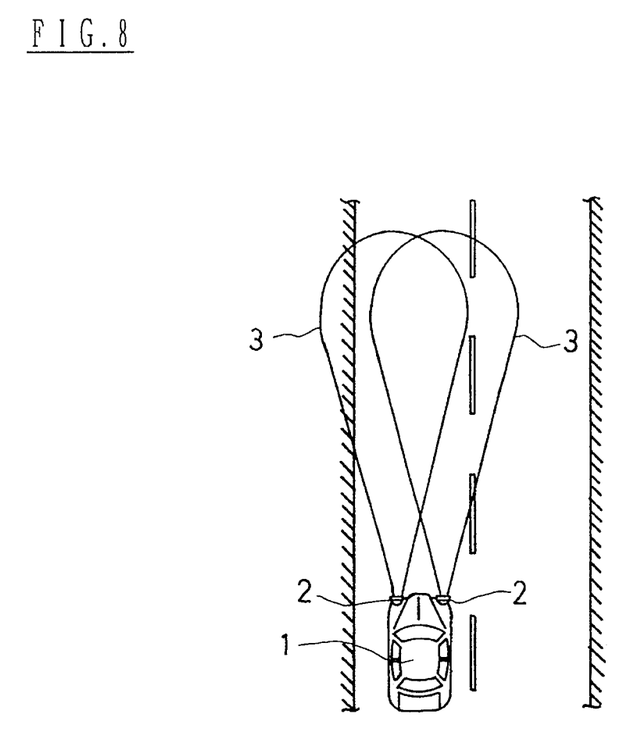
FIG. 8 is a view for showing a lighting region as viewed from above when a forward part is a linear advancing road.
Figure 9:
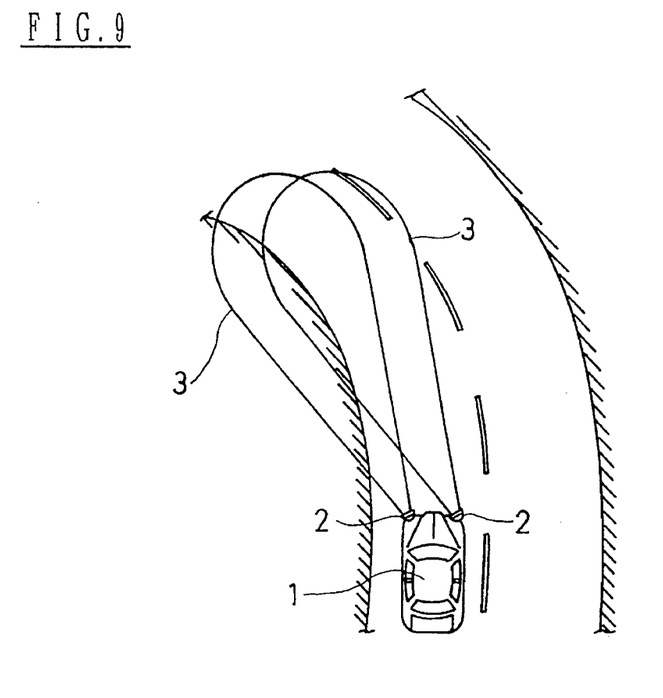
FIG. 9 is a view for showing a lighting region as viewed from above when a forward part is curved.

In the case that the vehicle runs on the planned running path, no optical axis control is carried out if the forward road in a traveling direction of the vehicle is a linear one as shown in FIG. 8. However, as shown in FIG. 9, when there is a leftward curve in the forward location, a curve pre-noticing signal is present through an inputting of the map information (step 2), and the operation enters the map information cooperating control mode (step 10). In this case, the optical axis angle θ is determined in view of the state of the curve and the like at first, and the optical axis control based on the optical axis angle θ and the navigation accuracy or the like is started when the vehicle reaches the predetermined distance S before the curve entrance and the light distribution is deflected leftward at a proper timing before the curve, resulting in that a superior visibility can be attained.

In the case that there is a crossing point in a forward traveling direction of the vehicle as shown in FIG. 10, a forward crossing point pre-noticing signal is given by the inputted map information (step 2) and no optical axis control is carried out until the vehicle passes through the crossing point node (the operation jumps from step 6 to step 11). During this period, when the winker lever is operated, the operation enters the direction indicating cooperating control mode to perform the optical axis control under this control mode (the operation jumps from step 3 to step 8). Upon the operation of the winker lever, at first, the light distribution is changed in one action to the predetermined optical axis angle θ steering direction so that the turning direction can be visually confirmed early, and then the lighting region is changed in correspondence with the steering angle when the steering angle exceeds the predetermined range, resulting in that the changing timing of the lighting region can be suitable and the visibility can be improved.

When a steering angle α exceeds the predetermined range, the operation enters the steering angle cooperating control mode and the optical axis control is carried out under this control mode (the operation jumps from step 5 to step 9) and also when the vehicle runs outside of the road data, the optical axis control is performed under the steering angle cooperating control mode (the operation jumps from step 4 to step 9), so that the control can be continued.

Under both direction indicating cooperating control mode and steering angle cooperating control mode, a vehicle speed is taken into consideration for determining the optical axis angle θ, so that the light distribution which is most suitable for a vehicle speed can be attained and the visibility is improved.

Although the right and left head lights in the aforesaid preferred embodiment are concurrently swung in the same direction to deflect the light distribution, it may also be available that only the head light at the turning side is swung or a certain difference is set between the swinging angles of the right and left head lights.

There is also another method in which two bulbs are installed in one head light and the light distribution is changed by separately using one bulb illumination and two-bulb illumination, respectively.

In addition, it may also be applicable that a sub-reflector is arranged against a main reflector and the sub-reflector is moved to change the light distribution.

In addition, although the curve information of a road is stored in advance in the aforesaid preferred embodiment, it may also be applicable that the state of curve is optionally judged during the running in reference to the forward node arrangement.

The present invention adjusts a lighting region in compliance with the estimation of the forward road shape in a traveling direction of the vehicle under a third control mode in reference to the map information and the present position when the direction indicating signal is not generated and the vehicle normally runs on the road data of the map information, so that the lighting region is changed early in the turning direction and the visibility is improved.

In addition, in the case that the vehicle runs on a place where no road data is present or the steering angle exceeds the predetermined range, the lighting region is adjusted in response to the steering angle under a second control mode, so that the control can be continued.

In addition, when the winker device is operated under a first control mode, at first, the lighting region is changed in one action into a predetermined region in the steering direction so as to enable an early visual confirmation of the turning direction, and thereafter when the steering angle exceeds the predetermined range, the lighting region is changed in response to the steering angle, thereby the changing timing for the lighting region can be made suitable and the visibility can be improved.

The control means changes at least one of either an adjusting amount of or an adjusting period of the lighting region under at least one of the first, second and third control modes in response to a vehicle speed of the vehicle speed signal so as to enable the visibility to be improved more and more.

Although there has been disclosed what is at present considered to be the preferred embodiment of the invention, it will be understood that modifications and variations may be made thereto without departing from the spirit or essence of the invention. The scope of the invention is indicated by the appended claims rather than by the foregoing description.

What is claimed is:

1. A head lamp device for a vehicle in which a lighting region in front of the vehicle can be adjusted in rightward and leftward directions, said device comprises:

direction indicating signal outputting means for detecting an operation of a winker device and outputting a direction indicating signal;

steering signal outputting means for detecting a steering angle of a steering device and outputting a steering angle signal;

map information outputting means for outputting map information including road data;

present position detecting means for detecting a present position of a proper vehicle on the map; and control means for inputting said direction indicating signal, steering angle signal, map information and information of the present position and adjusting the lighting region of said head lamp based thereon, and said control means selects a first control mode when said direction indicating signal is inputted; a second control mode for adjusting the lighting region in response to said steering angle when said first mode is not selected and said present position is not found on the road data of said map information or a steering angle of said steering angle exceeds a predetermined range; and a third control mode for adjusting the lighting region in compliance with an expectation of a forward road shape in a traveling direction of the vehicle in reference to said map information and the present position when said first and second control modes are not selected.

2. A head lamp device for a vehicle according to claim 1 wherein said first control mode is a control mode in which the lighting region is changed to a predetermined region in a steering direction when said direction indicating signal is generated and a detected steering angle of said steering angle signal is within a predetermined range and after this state, when a steering angle exceeding said predetermined range is detected, the lighting region is changed in response to said steering angle.

3. A head lamp device for a vehicle according to claim 1, including a vehicle speed signal outputting means for detecting a vehicle speed and outputting a vehicle speed signal, and said control means changes at least one of an adjusting amount or an adjusting period of the lighting region in response to the detected vehicle speed of said vehicle speed signal under at least one of said first, second and third control modes.

4. A head lamp device for a vehicle according to claim 2, including a vehicle speed signal outputting means for detecting a vehicle speed and outputting a vehicle speed signal, and said control means changes at least one of an adjusting amount or an adjusting period of the lighting region in response to the detected vehicle speed of said vehicle speed signal under at least one of said first, second and third control modes.

5. A head lamp device for a vehicle according to claim 1, wherein said road data output by said map information outputting means includes a plurality of nodes with different spacings therebetween dependent on a shape and other characteristics of the road.

6. A head lamp device for a vehicle according to claim 5, wherein said road data includes a node for each intersection in the road, and said control means temporarily suspends adjustment of the lighting region of the head lamp when the vehicle enters a section of the road corresponding to an intersection node.

7. A head lamp device for a vehicle according to claim 5, wherein said control means suspends adjustments of the lighting region of the headlamp when the forward road shape in the traveling direction of the vehicle is substantially straight.

8. A head lamp device for a vehicle according to claim 1, wherein said control means adjusts an optical axis angle of said head lamp.

9. A head lamp device for a vehicle according to claim 8, wherein said control means fixes said optical axis angle at a predetermined angle when the detected steering angle exceeds a predetermined value.

10. A head lamp device for a vehicle according to claim 1, wherein said control means shifts between said first, second and third control modes based on said direction indicating signal, said steering angle signal and the present position of the proper vehicle on the map.

11. A head lamp device for a vehicle in which a lighting region in front of the vehicle in a traveling direction is adjusted in rightward and leftward directions, the device comprising:

means for detecting an operation of a winker device and outputting a direction indicating signal;

means for detecting a steering angle of a steering device and outputting a steering angle signal;

means for outputting map information including road data;

means for detecting a present position of a proper vehicle on map information output by said map information outputting means; and control means for adjusting the lighting region of said head lamp in multiple, different control modes based on said direction indicating signal, said steering angle signal, said map information output by said map information outputting means, and the detected present position of the proper vehicle, said control means selects one of said multiple, different control modes based on said direction indicating signal, said steering angle signal, said map information output and said detected present position of the proper vehicle.

12. A head lamp device for a vehicle according to claim 11, wherein said multiple different control modes include at least one primary control mode based on a driver's steering input, and at least one secondary control mode based on said output map information and said detected position of the proper vehicle.

13. A head lamp device for a vehicle according to claim 11, wherein said control modes include a first primary control mode selected by said control means when said direction indicating signal is input, a second primary control mode selected by said control means in response to said steering angle signal, and a secondary control mode selected by said control means for adjusting the lighting region in compliance with an expectation of a forward road shape in a traveling direction of the vehicle in reference to said map information and the present position of the proper vehicle when said first and second control modes are not selected.

14. A head lamp device for a vehicle according to claim 13, wherein said control means shifts between said first and second primary control modes based on a value of said steering angle signal relative to a predetermined value.

15. A head lamp device for a vehicle according to claim 11, wherein said control means shifts from one selected control mode to another control mode when a steering angle exceeds a predetermined value.

16. A head lamp device according to claim 11, wherein said control means is shiftable from one selected control mode to another control mode during a turning operation of the vehicle.

17. A head lamp device for a vehicle according to claim 11, wherein said control means adjusts a timing of an adjustment of the lighting region of the head lamp based on at least one of a degree of curvature of a portion of road in front of the vehicle and an accuracy of said map information outputting means and said vehicle position detecting means.

* * * * *

UNITED STATES PATENT AND TRADEMARK OFFICE
CERTIFICATE OF CORRECTION

PATENT NO. : 5,588,733
DATED : December 31, 1996
INVENTOR(S) : Shinichirou Gotou It is certified that error appears in the above-indentified patent and that said Letters Patent is hereby corrected as shown below:

On the cover page, in the Abstract, line 11, before "proper" insert --a--;
    line 12, delete "said";
    line 23, before "forward" insert --a--.

Column 1, line 5, change "Field of Invention" to --Field of the Invention--.

Column 2, line 63, change "an" to --a--.

Column 3, line 36, change "An" to --A--.

Column 4, line 40, change "ect." to --etc.--;
    line 43, change "outputs" to --output is--.
    line 62, after "Thus" insert a comma.

Column 5, line 4, delete "to the";
    line 48, after "small" insert a comma;
    line 52, change "the exceeds a" to --$\alpha$ exceeds the--.

Column 6, line 16, delete "to";
    line 29, after "directed" delete the comma.

Column 7, line 56, after "$\theta$" insert --in a--.

Column 9, line number 23, before "exceeds" insert --signal--.

Signed and Sealed this

Fifth Day of August, 1997

Attest:

BRUCE LEHMAN

*Attesting Officer*      *Commissioner of Patents and Trademarks*